United States Patent

Ogura

Patent Number: 4,674,612
Date of Patent: Jun. 23, 1987

[54] AUXILIARY EQUIPMENT TRANSMISSION

[75] Inventor: Masami Ogura, Saitama, Japan

[73] Assignee: Honda Giken Kogyo Kabushiki Kaisha, Tokyo, Japan

[21] Appl. No.: 483,369

[22] Filed: Apr. 8, 1983

[30] Foreign Application Priority Data

Apr. 12, 1982 [JP] Japan .................................. 57-60654
Apr. 12, 1982 [JP] Japan .................................. 57-60655

[51] Int. Cl.⁴ .......................... F16H 5/46; F16H 3/74; F16D 47/04; F16D 43/18
[52] U.S. Cl. .................................... 192/48.92; 192/35; 192/81 C; 192/104 C; 74/752 E
[58] Field of Search ................. 192/3.52, 35, 36, 48.3, 192/48.4, 48.92, 81 C, 103 B, 104 C; 74/752 E; 474/70

[56] References Cited

U.S. PATENT DOCUMENTS

| | | | |
|---|---|---|---|
| 1,762,799 | 6/1930 | Starkey | 192/81 C |
| 1,826,054 | 10/1931 | Chryst | 192/81 C |
| 1,843,195 | 2/1932 | Banker | 192/81 C |
| 1,962,040 | 6/1934 | Smith-Clarke | 74/752 E |
| 2,452,650 | 11/1948 | Greenlee | 192/104 C X |
| 2,467,627 | 4/1949 | Olson | 192/81 C |
| 2,866,349 | 12/1958 | Heckethorn | 474/70 X |
| 3,019,874 | 2/1962 | Heckethorn | 192/48.92 X |
| 3,702,084 | 11/1972 | Kepple et al. | 74/752 E |
| 4,412,460 | 11/1983 | Barthelemy | 74/752 E |
| 4,450,942 | 5/1984 | Takefuta et al. | 192/48.92 X |

*Primary Examiner*—Rodney H. Bonck
*Assistant Examiner*—Richard M. Lorence
*Attorney, Agent, or Firm*—Lyon & Lyon

[57] ABSTRACT

A two speed transmission including a direct drive and a reduced speed ratio. The transmission is directly coupled to a variable speed engine crankshaft and includes pulleys thereon for the driving of auxiliary engine equipment. A first drive train includes planetary gearing and a one-way clutch while direct drive is provided by a wrap spring coupling cylindrical surfaces on the transmission input and transmission output axially adjacent and coterminous. The wrap spring includes an element having a flat side for engagement of the cylindrical surfaces. Two actuator mechanisms are illustrated employing centrifugal weights to result in advancement of one end of the wrap spring to tighten same into coupling engagements at low engine speeds. At higher engine speeds, the actuator mechanism releases the wrap spring from the cylindrical surfaces for drive through the planetary gearing.

12 Claims, 9 Drawing Figures

AUXILIARY EQUIPMENT TRANSMISSION

BACKGROUND OF THE INVENTION

The field of the present invention is transmissions for auxiliary equipment on variable speed engines.

Conventionally, powered accessories such as alternators, air conditioning pumps, power steering pumps and the like for an automobile or other vehicle have been driven from one end of the crankshaft by means of belts and pulleys. Such systems have resulted in the accessories being driven at velocities which are proportional to the rotating speed of the engine. Typically, an automobile engine will vary greatly in its operating speed range. Thus, the accessories have been required to operate over a wide range of speeds. At the low end or idle range for the engine, the driven speeds of the accessories may be considered marginally low while at the upper end of the engine speed range, the accessories are being driven needlessly fast.

It is desirable that the speed range of the accessories normally driven by an engine be rotated at a more uniform rate. By doing so, the accessories may operate more efficiently, useless power is not drained from the engine, greater reliability may be obtained and noise reduced. Additionally, with a limited speed range, certain of the accessories may be reduced in size and strength resulting in a savings of cost and power through smaller, lighter components.

To overcome the foregoing difficulties, devices have been developed which provide for some speed control. In the area of multiple fixed ratio transmissions, planetary gearing has been employed to provide speed reduction while direct drive through some clutching means provides a selectable second ratio. In the area of continuously variable ratios, variable diameter pulley mechanisms have been employed. Such systems are often needlessly complicated or provide a relatively weak or short lived clutching mechanism associated with at least one of the ratio modes.

SUMMARY OF THE INVENTION

The present invention is directed to a multispeed transmission mechanism for driving accessories on variable speed engines. The invention contemplates a first drive train through the transmission having speed change gearing with a clutch to appropriately engage the gearing for a first fixed drive ratio. A second drive train providing a direct drive ratio through the transmission is accomplished by means of a wrap spring about two cylindrical surfaces, one associated with the input and one associated with the output. A pivotal actuator mechanism is employed to actuate the wrap spring at preselected speed ranges by tightening the spring on the cylindrical surfaces.

The transmission mechanism thus defined has the ability to provide a low output speed ratio at higher engine speeds. This result enables the accessory equipment to be driven at a more efficient speed, giving greater fuel efficiency, reducing noise, increasing longevity of the components and allowing lighter, more efficient designs. The employment of the clutch mechanism including the wrap spring produces a reliable, frequently engaged and disengaged mechanism which may be controlled by a relatively weak input. The wrap spring itself produces a strong engaging force between the input and the output of the transmission responsive to the weak controlling input to the wrap spring. This mechanism further is advantageous because of the small space required for its installation, a necessity in providing a pulley output associated with the crankshaft without major modifications in the normal layout of most engines.

In another aspect of the present invention, the wrap spring is illustrated to be constructed of a spring element having a flat surface on the engaging side thereof. This naturally increases the efficiency of the spring itself to further improve the weak controlling input to strong holding output ratio of the device.

Alternate actuator mechanisms for the clutch are illustrated. Because of the need for relatively weak input for controlling the clutching mechanism, centrifugal weight mechanisms employing friction drums or actuator linkages and the like may be used without detrimental effect on the longevity or reliability of the system.

In view of the foregoing, a principal object of the present invention is to provide an improved multiple ratio transmission mechanism for driving accessories on a variable speed engine. Other and further objects and advantages will appear hereinafter.

DETAILED DESCRIPTION OF THE PREFERRED EMBODIMENT

Figure 1:
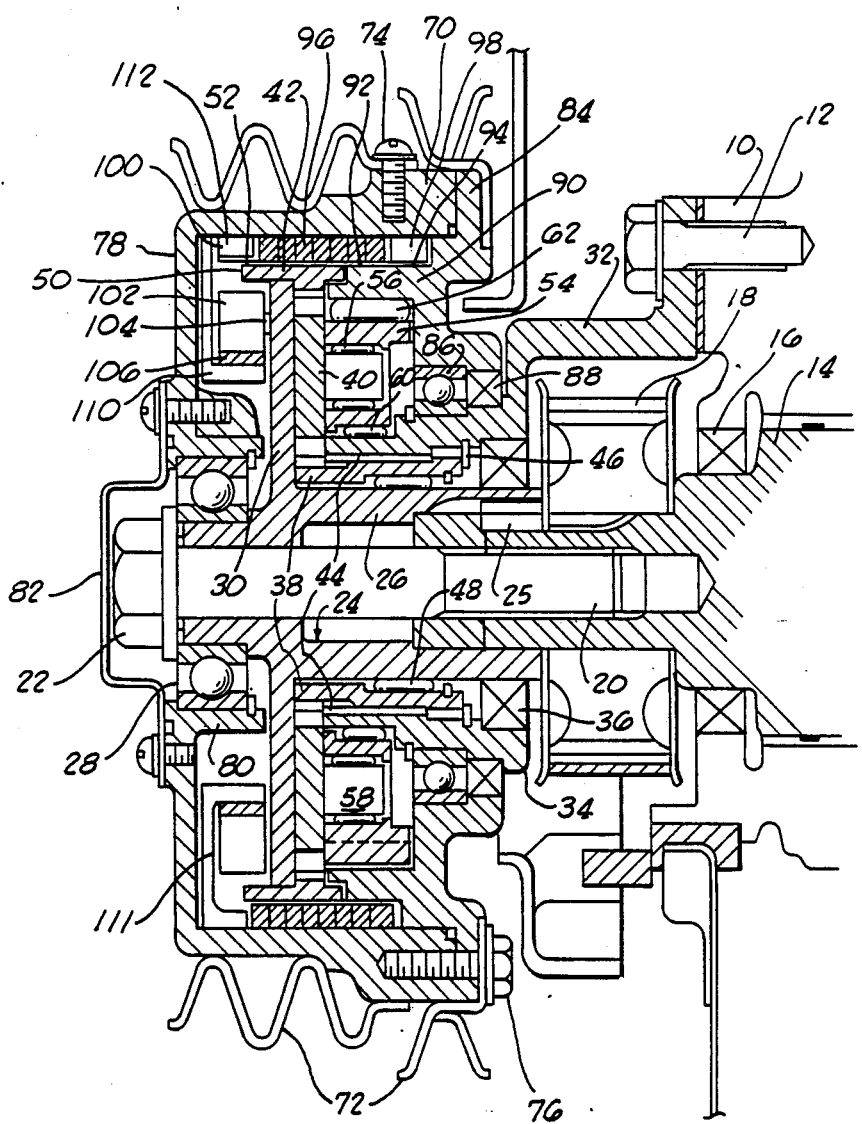
FIG. 1 is a cross-sectional elevation of a device of the present invention.
Figure 2:
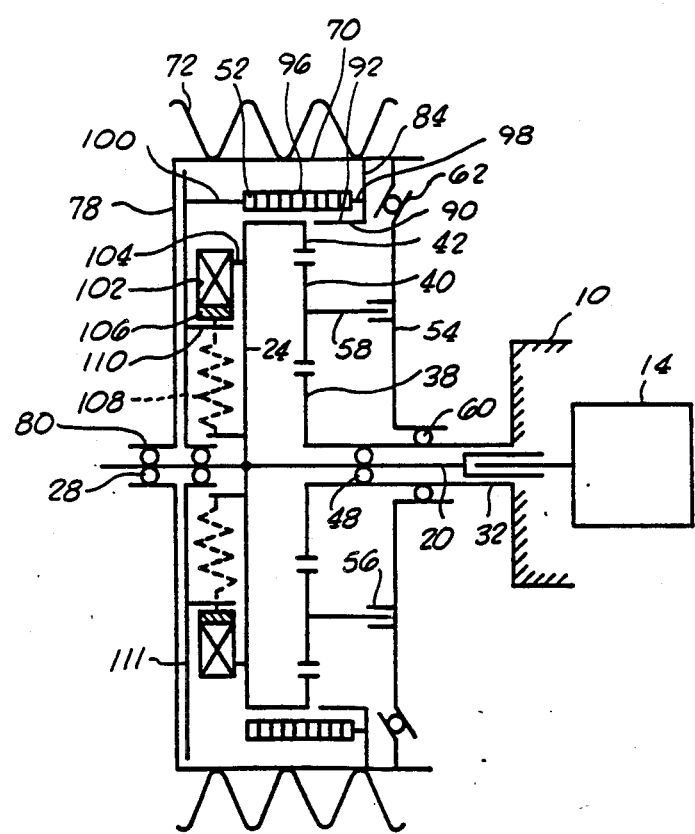
FIG. 2 is a functional schematic illustration of the present invention.

Turning in detail to the drawings, and initially the first embodiment of FIGS. 1-6, a transmission is disclosed which is shown to be mounted to an engine block 10 by means of fasteners 12 about the end of the crankshaft 14. It is preferred that the crankshaft 14 extends somewhat from the engine block 10 for purposes of the present device. However, other means for coupling with the crankshaft in a recessed condition may also be employed.

In the embodiment illustrated, the crankshaft 14 extends outwardly from the engine block 10 through a crankshaft seal 16. A timing belt pulley 18 is mounted to the extended portion of the crankshaft 14 and is so configured and keyed to cause it to rotate with the crankshaft 14. Not only is the transmission mounted to the engine block 10 by means of fasteners 12, portions of the transmission are more directly mounted to the crankshaft 14, principally by means of a retaining bolt 20. The retaining bolt 20 is threaded into the end of the crankshaft 14 and includes a shoulder at the bolthead 22 for retaining input components of the transmission.

Retained by the bolt 20 and acting as the transmission input is an input member 24. The input member 24 is fixed to rotate with the crankshaft 14 by means of a key 25 extending between corresponding keyways in the input member 24 and the crankshaft 14. The input member 24 includes a cylindrical hub 26 which extends concentrically with the shaft to hold the timing belt pulley 18 in place. A bearing 28 is mounted to the cylindrical hub 26 about its outer end where the bolthead 22 retains both the bearing 28 and the input member 24 in place. Extending outwardly from the cylindrical hub 26 of the input member 24 is a circular flange 30. Naturally, the flange 30, the cylindrical hub 26 and the crankshaft 14 all rotate together to provide the input to the transmission.

To provide both an element of reference relative to which the input rotates and to provide support for the transmission, a transmission frame member or holder 32 extends from the engine block 10. The holder 32 is fixed to the engine block 10 by means of the fasteners 12 and extends outwardly about the extention of the crankshaft 14 to form a broadly cylindrical structural member 34. A variety of components are fixed to or journaled about the structural member 34 as will be discussed appropriately below. An oil seal 36 extends between the cylindrical hub 26 and the structural member 34 to aid in the containment of lubricant within the transmission.

Figure 3:
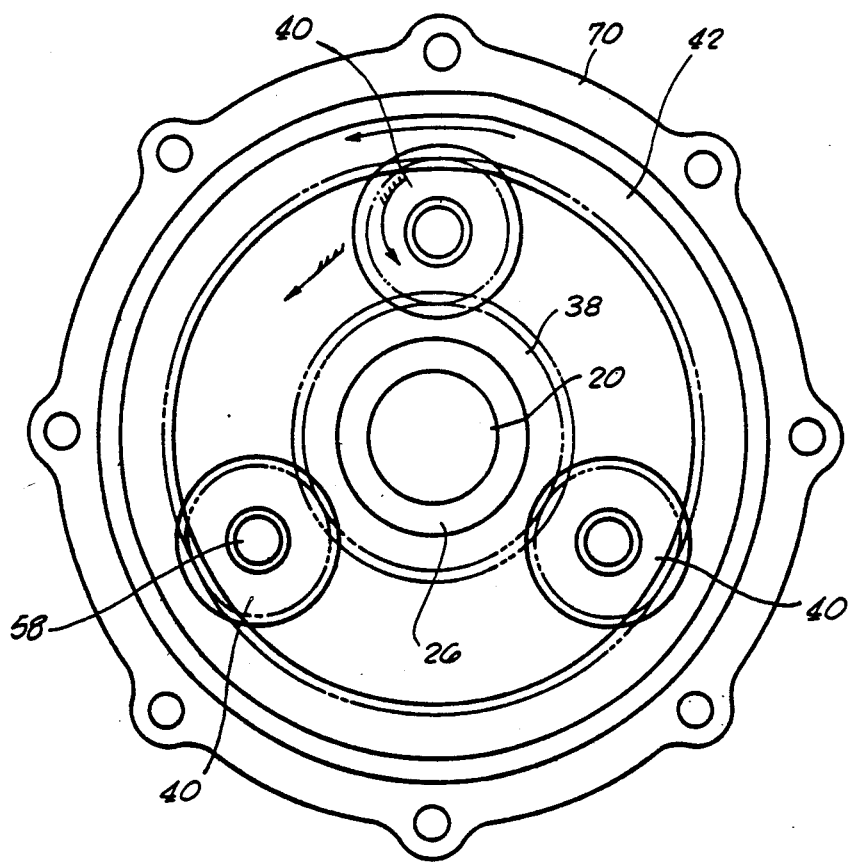
FIG. 3 is a partially schematic front view of the planetary gears of the embodiment of FIG. 1.

Looking next to a first drive train through the transmission, an arrangement of speed change gearing is employed. More specifically, a planetary gear system, somewhat schematically illustrated in FIG. 3 is employed. This system includes a sun gear 38, three planet gears 40 and a ring gear 42. The sun gear 38 is fixed to the structural member 34 by means of splines 44. To hold the sun gear 38 axially positioned, a retaining ring 46 is positioned on the structural member 34. The sun gear 38 is positioned on the inside of the structural member 34 and the cylindrical hub 26 of the input member 24 is positioned inwardly of the sun gear 38. To further promote cooperation between the several elements, needle bearings 48 are arranged between the sun gear 38 and the cylindrical hub 26.

The ring gear 42 is fixed to the outer periphery of the flange 30 of the input member 24. A cylindrical flange 50 extends laterally from the ring gear 42 over the flange 30. The ring gear 42 includes about its outer periphery a cylindrical surface 52. Because the ring gear 42 is fixed to the flange 30, the cylindrical surface 52 is constrained to rotate with the transmission input and in turn the crankshaft 14.

Linked between the sun gear 38 and the ring gear 42 are the three planet gears 40. The planet gears 40 are journaled in a carrier 54 and are equiangularly placed about the sun gear 38 in the carrier 54. The carrier 54 includes bearings 56 about each shaft 58 of each planet gear 40. The carrier 54 is itself journaled about the structural member 34 with bearings 60. The carrier 54 is free to rotate relative to the structural member 34 as may be constrained by movement of the ring gear 46.

Figure 4:
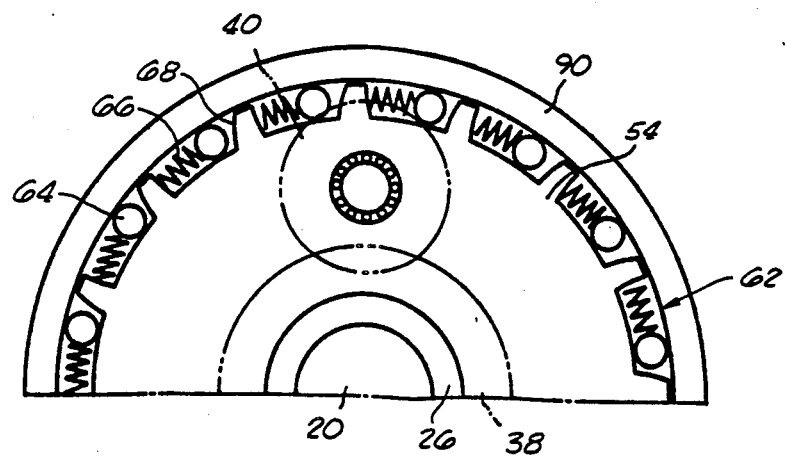
FIG. 4 is a partially schematic front view of a one-way clutch of t e embodiment of FIG. 1.
Figure 5:
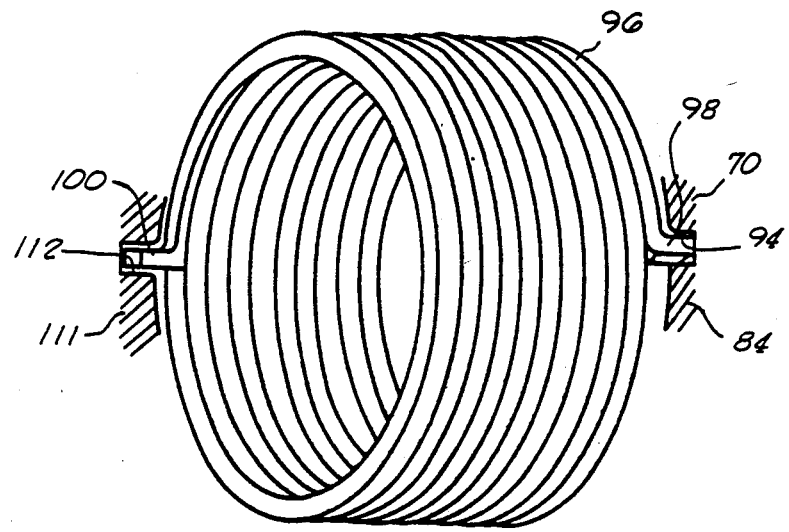
FIG. 5 is a perspective view of a wrap spring of the embodiment of FIG. 1.

Through the planetary gear system including the ring gear 42, the planet gears 40 and the sun gear 38, the carrier 54 is rotated at a reduced speed to that of the ring gear 42 and in turn the transmission input. In the preferred embodiment, this ratio has been selected as one to three. As an additional portion of the first drive train, and as a means for selectively deriving torque from the planetary gearing, a one-way clutch 62 is employed between the carrier 54 and the transmission output. This clutch is schematically illustrated in FIG. 4 as including rollers 64 and springs 66 biasing the rollers in a first direction. The carrier 54 includes inclined cavities 68 within which the roller 64 and spring 66 are positioned. When the carrier 54 rotates at a speed less than that of the transmission output, the one-way clutch 62 is disengaged. When the transmission output is not driven by other means, the carrier 54 becomes locked with the transmission output by means of wedging of the spring biased rollers 64 in the inclined cavities 68.

The transmission output is illustrated in this first preferred embodiment as including a cylindrical housing 70 to which are affixed pulleys 72. The pulleys 72 are shown to be conveniently formed from sheet metal material so as to give three V-grooves for receipt of pulley belts. The pulleys 72 may be conveniently fastened to the cylindrical housing 70 by means of fasteners 74 and 76. The cylindrical housing 70 includes a front wall 78 extending radially inwardly to a supporting hub 80. The hub 80 is rotatably supported by the bearing 28 which is in turn fixed on the cylindrical hub 26 of the input member 24. A front cover 82 is fastened to the hub 80 and conveniently covers the head of the retaining bolt 20. The front cover 82 thus permits disassembly of the unit by access to the retaining bolt 20 and also provides a seal for lubricant and the like within the transmission.

Fixed to the cylindrical housing 70 by fasteners 76 is a rear cover 84. The rear cover 84 extends radially inwardly from the cylindrical housing 70 to a ball bearing 86 which is in turn mounted on the holder 32. An oil seal 88 closes the transmission adjacent the ball bearing 86. The rear cover 84 of the output housing includes an inwardly extending cylindrical flange 90. The inwardly extending cylindrical flange 90 includes an inner-cylindrical surface which cooperates with the one-way clutch 62 by providing a surface against which the rollers 64 may be wedged. The cylindrical flange 90 also defines an outer cylindrical surface 92 which is axially adjacent and coterminous with the cylindrical surface 52 of the ring gear 42. Also provided with the rear cover 84 of the housing is a slot 94 for receiving a wrap spring as will be discussed below.

A second drive train between the input of the transmission and the output for effecting a direct drive through the transmission is provided by means of a wrap spring 96. The wrap spring 96 is positioned about the cylindrical surface 52 and the cylindrical surface 92. The wrap spring 96 extends to two ends, 98 and 100. A first end 98 is positioned in the slot 94 of the transmission output and thus the wrap spring 96 rotates with the transmission output. The second end 100 extends toward the input side of the transmission and a pivotal actuator mechanism located therein. The wrap spring 96 includes an element defining the spring which has a flat surface on the inside of the coil so as to increase the surface area of contact between both of the cylindrical surfaces 52 and 92. Indeed, the element of the wrap spring 96 is generally rectangular, including square, in cross section to best achieve this result. The wrap spring 96 is also shown to have a slight clearance with that of the cylindrical surfaces 52 and 92.

It can be seen, particularly in FIG. 1, that the wrap spring 96 requires a minimal volume and does not significantly affect the overall size of the device. At the same time, when fully tightened against the cylindrical surfaces 52 and 92, a rigid direct coupling exists between the transmission input and transmission output. In this way, a direct drive from the crankshaft 14 to the output pulleys 72 is achieved.

Figure 6:
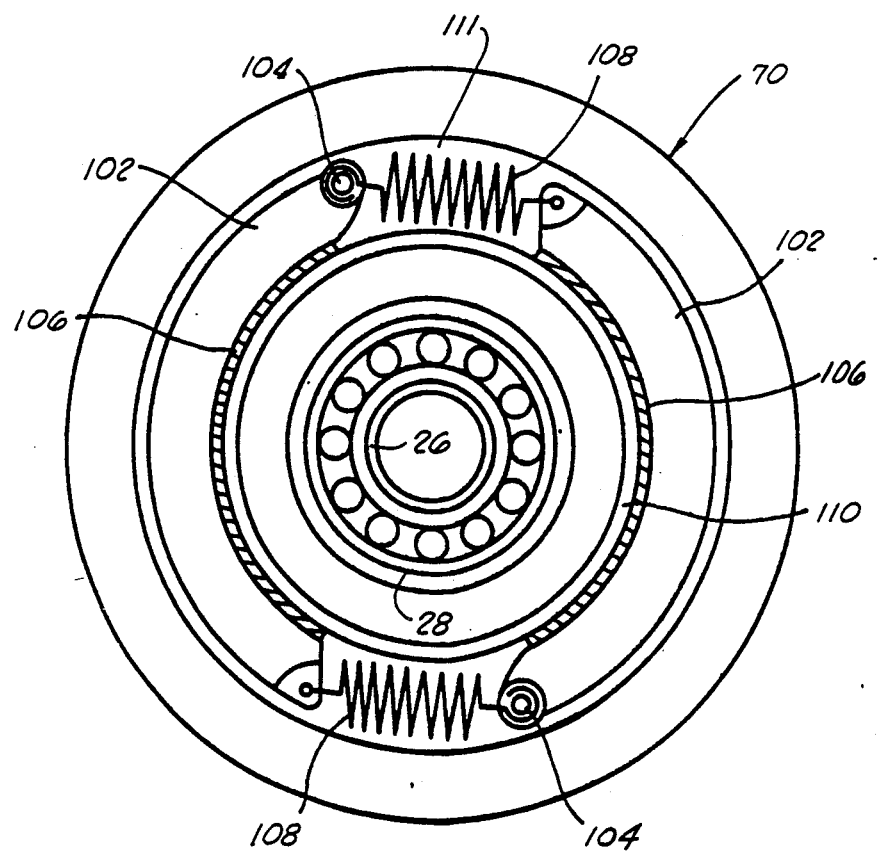
FIG. 6 is a front view of a pivotal actuator mechanism of the embodiment of FIG. 1.

To control the wrap spring 96, a pivotal actuator mechanism is employed. The pivotal actuator mechanism in the embodiment of FIGS. 1-6 is provided by a centrifugal clutch which operates to pivot and bias the second or input end 100 of the wrap spring 96 relative to the first end 98 at the low speeds of the engine. An input to the centrifugal clutch is provided by means of spring loaded centrifugal weights 102. These weights are best illustrated in FIG. 6. The weights 102 are pivotally mounted to pins 104 which are fixed to the flange 30 of the input member 24. The weights 102 include friction shoes 106 on their inner surfaces forming arcs of a circle. Tension springs 108 extend from the pins 104 to the adjacent spring loaded centrifugal weight 102. The springs 108 are conventionally preloaded such that the centrifugal weight 102 will move outwardly at a specific centrifugal force. Thus, the clutch input is from the transmission input via the flange 30 and rotates with the input and the crankshaft 14 of the engine.

The clutch output is attached to the second end 100 of the wrap spring 96 and thus rotates with the output of the transmission and the wrap spring 96. To this end, a friction drum 110 is employed. The drum 110 is provided with a radial flange 111 extending outwardly to a slot 112 for coupling to the wrap spring end 100. The friction drum 110 is associated with the spring loaded centrifugal weights 102 by providing a surface upon which the friction shoes 106 bear. The friction drum 110 generally rotates with the housing 70 of the output with the exception of the small relative pivotal movement needed to engage or disengage the wrap spring 96. Therefore, the mounting of the friction drum 110 must allow for some small pivotal movement. To this end, the radial flange extends to the inside of the cylindrical housing 70 within which the drum 110 can move. As the relative movement is very limited and the drum location within the centrifugal weights 102 not critical, no low friction bearing is needed.

In operation, the first embodiment illustrated in FIGS. 1-6 operates at low speed with the pivotal actuator mechanism consisting of the centrifugal clutch in the engaged position. In this mode, the crankshaft 14 drives the input member 24 which in turn advances the input end 100 of the wrap spring 96 via the unitary movement of the centrifugal weights 102 and the friction drum 110. By advancing the input end of the wrap spring 96, the wrap spring 96 is caused to tighten on both centrifugal surfaces 52 and 92 of the ring gear 42 and the inwardly extending cylindrical flange 90 of the cylindrical housing 70, respectively. The transmission output via the cylindrical housing 70 is retarded by the load of the auxiliary equipment on the pulleys 72. Once the wrap spring 96 fully engages the cylindrical surfaces 52 and 92, the transmission input and transmission output are caused to rotate together in a direct drive arrangement. This is accomplished through the pivotal movement of the actuator mechanism which does not experience excessive loads as little force is needed to appropriately tighten the wrap spring 96.

In the direct drive mode, the planetary gearing will naturally be rotating under the inducement of the ring gear 42. The carrier 54 will be rotating at a reduced speed to that of the ring gear 42 and that of the output housing 70. Thus, the one-way clutch will be disengaged by retraction of the rollers 64 against the springs 66.

When a preselected speed is reached by the input from the crankshaft 14, the centrifugal weights 102 will have sufficient centrifugal force imposed thereon to act against the loaded springs 108. Once the centrifugal weights 102 move outwardly, the coupling between the input member 24 and the end 100 of the wrap spring 96 is broken. By releasing the input end 100 of the wrap spring 96, the wrap spring is allowed to relax and lift off of the cylindrical surfaces 52 and 92. Thus, the direct drive link between the ring gear 42 and the cylindrical housing 70 is lost. However, the planetary gearing continues to be driven by the ring gear 42 such that the carrier 54 is rotating at a reduced speed. The load on the pulleys 72 causes the transmission output to be slowed until the speed of the carrier 54 matches that of the cylindrical housing 70. At this time, the rollers 64 are wedged into the small end of the inclined cavity 68 by the spring 66 such that engagement of the inner cylindrical surface of the inwardly extending cylindrical flange 90 occurs. At this time, the cylindrical housing 70 will be caused to be driven at the speed of the carrier 54. Thus, a reduced ratio drive is accomplished. Naturally, when the input speed is reduced, the centrifugal clutch will again engage and direct drive will be returned.

Figure 7:
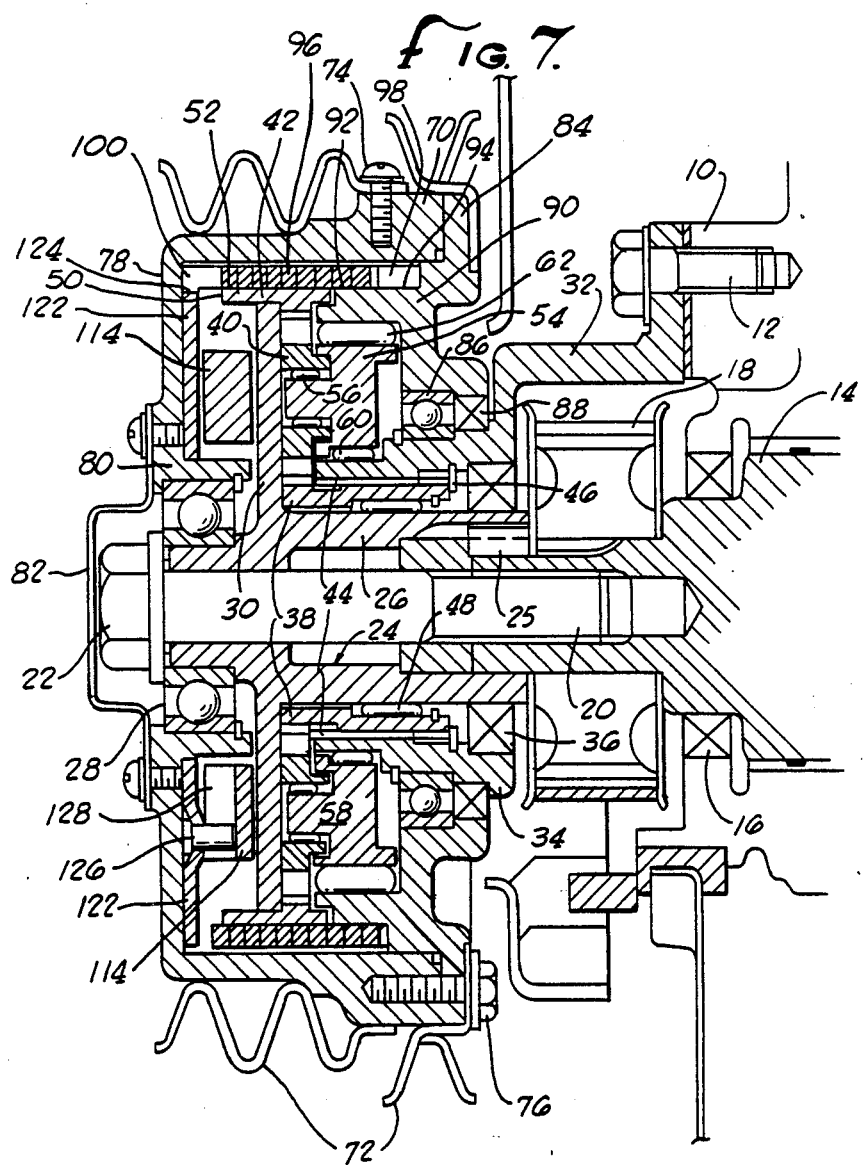
FIG. 7 is a cross-sectional elevation of a second embodiment of the present invention.
Figure 8:
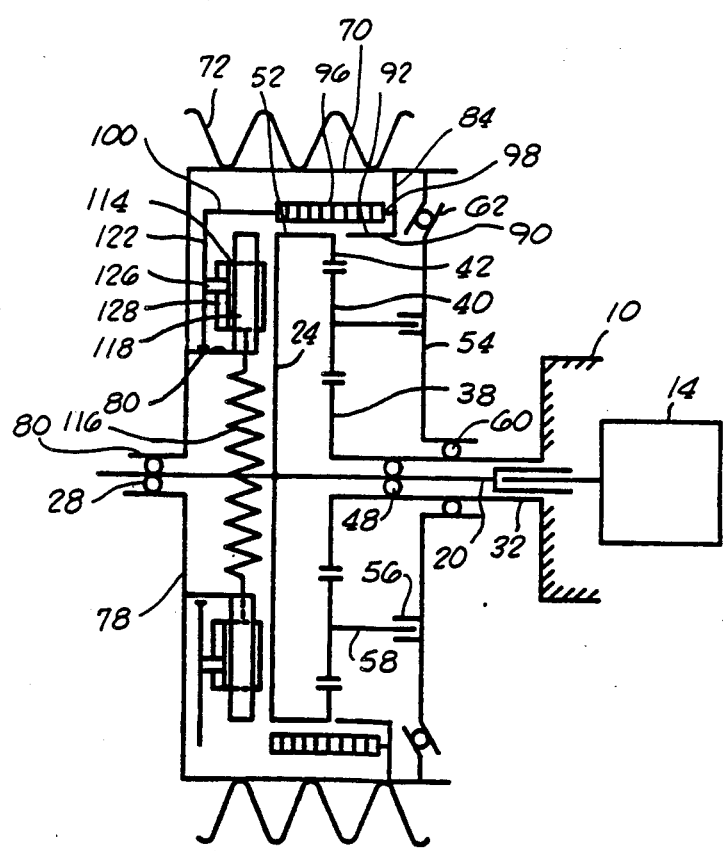
FIG. 8 is a functional schematic of the embodiment of FIG. 7.
Figure 9:
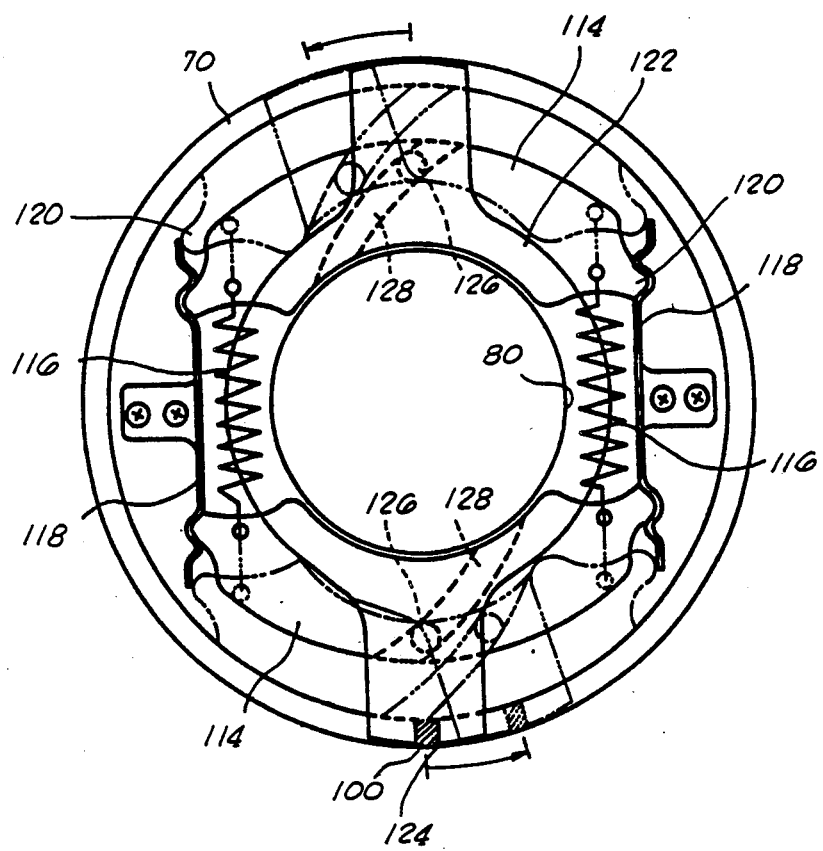
FIG. 9 is a front view of a pivotal actuator mechanism of the embodiment of FIG. 7.

FIGS. 7-9 illustrate a second embodiment of the present invention. Because of the substantial similarity between embodiments, the same numerals will be applied where appropriate to the figures of this second embodiment. The principal difference intended to be illustrated by this second embodiment is a variation on the pivotal actuator mechanism which controls the wrap spring 96. The actuator mechanisms illustrated are to be but two forms of many such possible systems. Additionally, hydraulic or electrical switching responsive to speed sensing of the engine may be employed.

The actuator mechanism of the second embodiment specifically includes spring loaded centrifugal weights 114. These centrifugal weights 114 include tension springs 116 extending therebetween as best illustrated in FIG. 9. The centrifugal weights 114 are caused to be moved outwardly by centrifugal force upon reaching a preselected speed. To help guide, rotate and control the centrifugal weights 114, cantilever leaf springs 118 engage end protrusions 120 on each centrifugal weight 114. With the weights in the closest position toward one another, the protrusions 120 engage recesses in the springs 118. As the weights 114 move outwardly, they act against the leaf springs to move out of the recesses. Thus, an overcenter mechanism is created to prevent oscillations in the centrigual weights 114 near the critical switching speed range. The leaf springs are fixed to the frontwall 78 of the output housing 70 to cause rotation of the centrifugal weights 114 with the transmission output. As the output speed will be reduced with the ratio change, the leaf spring 118 over center mechanism must keep the centrifugal weights 114 in the outer position with the resulting speed reduction.

An input plate 122 is arranged adjacent the spring loaded centrifugal weights 114. This input plate 122 is connected by means of a slot 124 to the input end 100 of the wrap spring 96. Coupling the centrifugal weights 114 and the input plate 122 is a pin and groove mechanism including two pins 126 and corresponding spiral grooves 128. The pins 126 and grooves 128 are arranged such that as the centrifugal weights move outwardly, the input plate 122 is advanced as can best be seen in phantom. Naturally, the location of the pins and the direction of the spiral of the grooves will determine the direction of advancement. In the preferred embodiment, it is intended that the wrap spring 96 be held in its coupling position with the centrifugal weights 114 held inwardly by the tension springs 116. In this way, a reduced speed ratio is achieved by the transmission with higher engine speeds.

Accordingly, two embodiments of a two-speed transmission having a direct drive and a reduced speed ratio for driving auxiliary equipment associated with a variable speed engine has been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. In a transmission including a drive train having speed change gearing and a one-way clutch between a transmission input and a transmission output, the improvement comprising
    a first cylindrical surface fixed to rotate with the transmission input;
    a second cylindrical surface fixed to rotate with the transmission output, said cylindrical surfaces being axially adjacent and coterminous;
    a wrap spring about said cylindrical surfaces having a first end attached to the transmission output and a second end;
    a pivoral actuator mechanism attached to said second end to pivot and bias said second end relative to said first end at a selected speed range of the transmission; and,
    said pivotal actuator mechanism including a centrifugal clutch having input and a clutch output, said clutch input being fixed to rotate with the transmission input and said clutch output being coupled to said second end of said wrap spring.

2. In the transmission of claim 1, said wrap spring having a spring element witha flat surface adjacent said cylindrical surfces.

3. In the transmission of claim 2, said wrap spring having said spring element being of rectangular cross section.

4. In the transmission of claim 1, said centrifugal clutch further including an engagement mechansim, wherein said engagement mechanism includes spring loaded centrifugal weight and a friction drum to which said weights frictionally engage; said engagement mechanism is attached between said clutch input and said clutch output.

5. In a transamission including a drive train having speed change bearing and a one-way clutch between a transmission input and a transmission output, the improvement comprising
    a first cylindrical surface fixed to rotate with the transmission input;
    a second cylindrical surface fixed to rotate with the transmission output, said cylindrical surfaces being axially adjacent and coterminous;
    a wrap spring about said cylindrical surfaces having a first end attached to the transmission output and a second end;
    a pivotal actuator mechanism attached to said second end to pivot and bias said second end relative to said first end at a selected speed range of the transmission; and,
    and pivotal actuator mechanism including spring loaded centrifugal weights, an input plate and a pin and groove mechanism coupling said centrifugal weights and said input plate, said input plate being attached to said second end of said wrap spring and said centrifugal weights being fixed to rotate with the transmission output.

6. In the transmission of claim 5, said pivotal actuator mechanism further includng overcenter springs biased against said spring-loaded centrifugal weights.

7. A transmission comprising in combination
    a transmission input;
    a transmission output;
    a drive train including planetary gearing and a one-way clutch coupled between said transmission input and said transmission output; with
    a first cylindrical surface fixed to rotate said transmission input;
    a second cylindrical surface fixed to rotate with said transmission output, said cylindrical surfaces being axially adjacent and coterminous;
    a wrap spring about said cylindrical surfaces having a first end attached to said transmission output and a second end;
    a pivotal actuator mechanism attached to said second end to pivot and bias said second end relative to said first end at a selected speed range of said transmission; and,
    wherein said planetary gearing includes a ring gear, said first cylindrical surface being about the periphery of said ring gear, said ring gear being fixed to said transmission input.

8. The transmission of claim 7 wherein said wrap spring includes a spring element with a flat surface adjacent said cylindrical surfaces.

9. The transmission of claim 8 wherein said spring element is of rectangular cross section.

10. The transmission of claim 7 wherein said one-way clutch is coupled between said planetary/ gearing and said transmission output.

11. A transmission comprising in combination
    a transmission input;
    a transmission output;
    a drive train including planetary gearing and a one-way clutch coupled between said transmission input and said transmission output;
    a first cylindrical surface fixed to rotate with said transmission input;
    a second cylindrical surface fixed to rotate with said transmission output, said cylindrical surfaces being axially adjacent and coterminous;
    a wrap spring about said cylindrical surfaces having a first end attached to said transmission output and a second end; and
    a pivotal actuator mechanism including an engagement mechanism having spring loaded centrifugal weights and a friction drum to which said centrifugal weights engage, said engagement mechansim being coupled between said transmission input and said second end of said wrap spring.

12. A transmission comprising in combination
    a transmission input;
    a transmission output;
    a drive train including planetary gearing and a one-way clutch coupled between said transmission input and said transmission output;
    a first cylindrical surface fixed to rotate with said transmission input;

a second cylindrical surface fixed to rotate with said transmission output, said cylindrical surfaces being axially adjacent and coterminous;

a wrap spring about said cylindrical surfaces having a first end attached to said transmission output and a second end; and a pivotal actuator mechanism including spring loaded centrifugal weights, an input plate and a pin and groove mechanism coupling said centrifugal weights and said input plate, said input plate being attached to said second end of said wrap spring and said centrifugal weights being fixed to rotate with the transmission output.

* * * * *

UNITED STATES PATENT AND TRADEMARK OFFICE
CERTIFICATE OF CORRECTION

PATENT NO. : 4,674,612

DATED : June 23, 1987

INVENTOR(S) : Masami Ogura

It is certified that error appears in the above-identified patent and that said Letters Patent are hereby corrected as shown below:

On line 31, column 7, replace "pivoral" with -- pivotal --.

On line 42, column 7, replace "surfces" with -- surfaces --.

On line 49, column 7, replace "weight" with -- weights --.

On line 54, column 7, replace "bearing" with -- gearing --.

On line 16, column 8, omit "with."

Signed and Sealed this

Nineteenth Day of April, 1988

Attest:

DONALD J. QUIGG

*Attesting Officer*   *Commissioner of Patents and Trademarks*